US010263706B2

(12) United States Patent
Truong et al.

(10) Patent No.: US 10,263,706 B2
(45) Date of Patent: Apr. 16, 2019

(54) SINGLE-FIBER BIDIRECTIONAL CONTROLLER AREA NETWORK BUS

(71) Applicant: The Boeing Company, Chicago, IL (US)

(72) Inventors: Tuong K. Truong, Bellevue, WA (US); Dennis G. Koshinz, Bellevue, WA (US); Eric Y. Chan, Mercer Island, WA (US); Kim Quan Anh Nguyen, Seattle, WA (US); Sean M. Ramey, Redmond, WA (US); Timothy E. Jackson, Arlington, WA (US); Barkhung Henry Pang, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/489,810

(22) Filed: Apr. 18, 2017

(65) Prior Publication Data

US 2018/0302165 A1    Oct. 18, 2018

(51) Int. Cl.
*H04B 10/278* (2013.01)
*G02B 6/42* (2006.01)
(Continued)

(52) U.S. Cl.
CPC ............ *H04B 10/278* (2013.01); *G02B 6/28* (2013.01); *G02B 6/30* (2013.01); *G02B 6/4206* (2013.01);
(Continued)

(58) Field of Classification Search
CPC .................................................. H04B 10/278
(Continued)

(56) References Cited

U.S. PATENT DOCUMENTS 4,491,942 A * 1/1985 Witte .................... H04B 10/27
370/446
4,573,215 A * 2/1986 Oates ................. H04B 10/2725
385/24
(Continued)

FOREIGN PATENT DOCUMENTS

DE     202005008437 U1    10/2005
EP        0517315 B1       11/1995
(Continued)

OTHER PUBLICATIONS

Grawer et al., Using a Fiber Optic CAN Bus for the Proton Source Control of the CERN PS-Linac, 1997.*
(Continued)

*Primary Examiner* — Kenneth N Vanderpuye
*Assistant Examiner* — Jai M Lee
(74) *Attorney, Agent, or Firm* — Ostrager Chong Flaherty & Broitman P.C.

(57) ABSTRACT

A controller area network (CAN) comprising a plurality of CAN nodes that communicate via a CAN bus that comprises a fiber optical network. The fiber optical network uses a single fiber and a single wavelength for transmit and receive, and comprises a passive reflective optical star. The reflective optical star comprises an optical mixing rod having a mirror at one end. The other end of the reflective optical star is optically coupled to the transmitters and receivers of a plurality of optical-electrical media converters by way of respective high-isolation optical Y-couplers. Each CAN node produces electrical signals (in accordance with the CAN message-based protocol) which are converted into optical pulses that are broadcast to the fiber optical network. Those optical pulses are then reflected back to all CAN nodes by the reflective optical star.

13 Claims, 9 Drawing Sheets

(51) Int. Cl.
  *G02B 6/44* (2006.01)
  *G02B 6/30* (2006.01)
  *H04L 12/40* (2006.01)
  *H04B 10/272* (2013.01)
  *H04B 10/50* (2013.01)
  *H04B 10/66* (2013.01)
  *G02B 6/28* (2006.01)
  *H04B 10/27* (2013.01)

(52) U.S. Cl.
  CPC .......... *G02B 6/4246* (2013.01); *G02B 6/443* (2013.01); *H04B 10/27* (2013.01); *H04B 10/272* (2013.01); *H04B 10/50* (2013.01); *H04B 10/66* (2013.01); *H04L 12/40* (2013.01); *H04L 2012/40215* (2013.01)

(58) Field of Classification Search
  USPC .......................................................... 398/60
  See application file for complete search history.

(56) References Cited

U.S. PATENT DOCUMENTS

| | | | | |
|---|---|---|---|---|
| 4,701,904 | A * | 10/1987 | Darcie | H04H 20/69 398/118 |
| 4,787,693 | A | 11/1988 | Kogelnik et al. | |
| 4,943,136 | A | 7/1990 | Popoff | |
| 5,068,847 | A * | 11/1991 | Stout | H04B 10/07953 398/139 |
| 5,663,818 | A * | 9/1997 | Yamamoto | H04Q 11/0001 398/1 |
| 6,249,363 | B1 * | 6/2001 | Arita | G06F 13/4022 398/9 |
| 7,965,913 | B2 | 6/2011 | Chan et al. | |
| 9,057,846 | B2 * | 6/2015 | Xi | G02B 6/3816 |
| 9,983,374 | B2 * | 5/2018 | Li | G02B 6/4292 |
| 2004/0027152 | A1 * | 2/2004 | Binder | H03K 19/0005 326/30 |
| 2004/0032586 | A1 | 2/2004 | Nagasaka et al. | |
| 2006/0160511 | A1 * | 7/2006 | Trichy | G06F 13/4072 455/255 |
| 2009/0183033 | A1 * | 7/2009 | Ando | H04L 43/0823 714/43 |
| 2009/0257716 | A1 * | 10/2009 | Chan | G02B 6/2817 385/46 |
| 2011/0206381 | A1 * | 8/2011 | Ji | H04B 10/801 398/140 |
| 2011/0211843 | A1 * | 9/2011 | Tan | H04B 10/278 398/141 |
| 2011/0243566 | A1 | 10/2011 | Truong | |
| 2012/0189302 | A1 * | 7/2012 | Yuki | H04B 10/272 398/36 |
| 2014/0314422 | A1 | 10/2014 | Shao et al. | |
| 2015/0029902 | A1 * | 1/2015 | Tischler | H04L 12/40189 370/276 |
| 2016/0173513 | A1 * | 6/2016 | Rohde | H04L 63/1416 726/23 |
| 2017/0359128 | A1 * | 12/2017 | Xi | H04L 12/40 |

FOREIGN PATENT DOCUMENTS

| | | |
|---|---|---|
| EP | 0800099 a2 | 10/1997 |
| EP | 1921801 A2 | 5/2008 |
| EP | 2108984 A1 | 10/2009 |
| EP | 1921801 A3 | 10/2013 |

OTHER PUBLICATIONS

Corrigan, Steve, Introduction to the Controller Area Network (CAN), 2016, Texas Instruments.*
Godse et al., Digital Logic Design, 2009, p. 8-82.*
Rao, T. V., CAN Bus in Aviation, 2009, pp. 1-5.*
Rohr et al., "High Speed Optical Controller Area Networks (CAN)", Proc. CAN in Automation, iCC 2005, pp. 04-1 to 04-8.
RTD Embedded Technologies, Inc., CAN Spider, http://www.rtd.com/PC 104/UM/network/CAN%20SPIDER.htm.
Extended European Search Report dated Sep. 17, 2018 issued in European Patent Application No. 18166886.4 (European counterpart of the instant U.S. patent application).
Stephan Rohr et al., "High Speed Optical Controller Area Networks (CAN)", May 20, 2005.
Daniel Kraus et al., "Replacement of the Controller Area Network (CAN) protocol for future automotive bus system solutions by substitution via optical networks", 18th Int'l Conf. on Transparent Optical Networks, IEEE. Jul. 10, 2016.

* cited by examiner

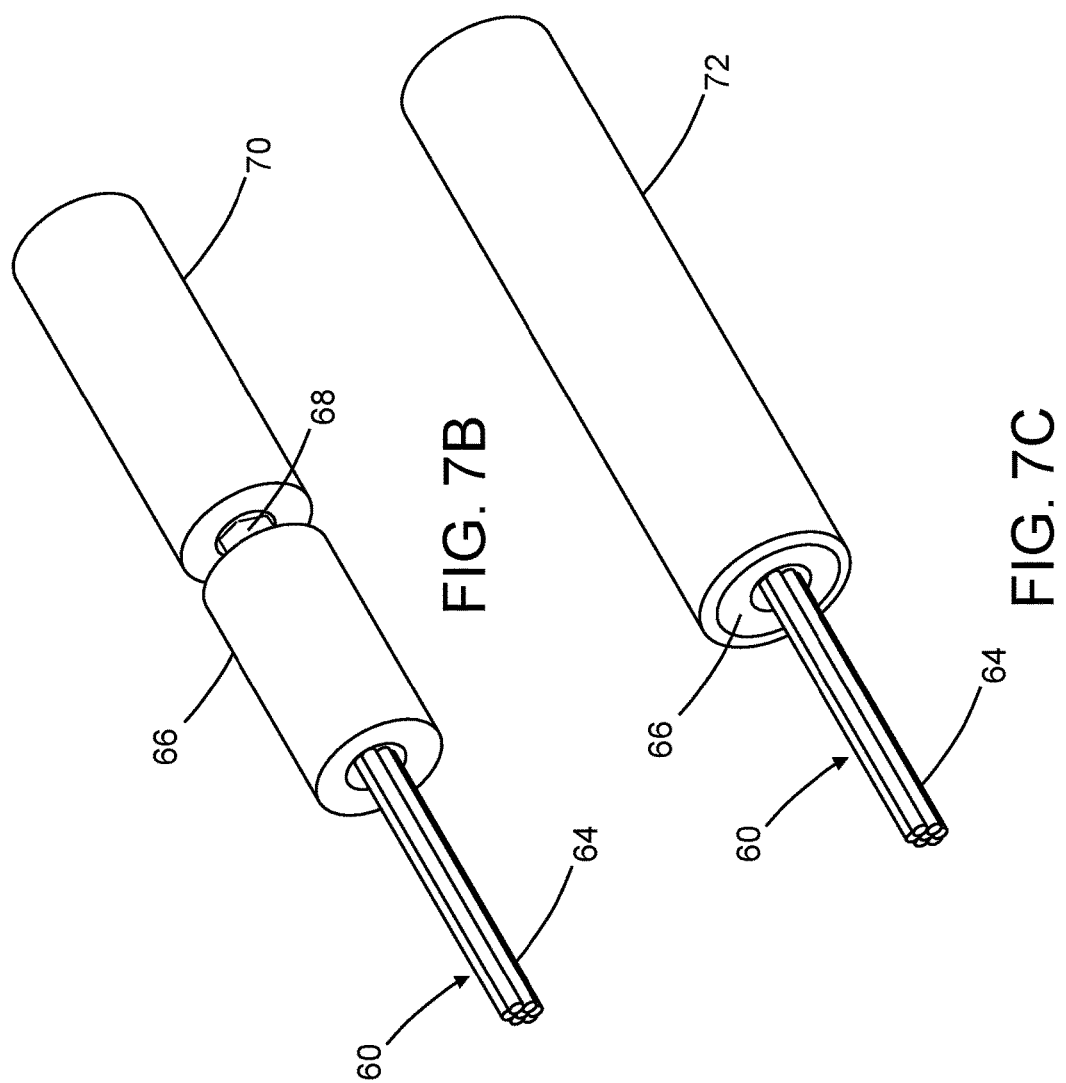

SINGLE-FIBER BIDIRECTIONAL CONTROLLER AREA NETWORK BUS

BACKGROUND

The technology disclosed herein generally relates to optical networks that enable communication between electrical components.

Data transmission between electrical components is typically achieved via a network comprising electrical cables. In analog avionic systems the number of cables used to transfer information between the various system components can be considerable. In digital systems, signals are transmitted along a single pair of wires, which makes up a data bus. A bus is a collection of wires through which data is transmitted from one part of a network to another. Bus systems provide an efficient means of exchanging data between the diverse avionic systems onboard an aircraft. All buses consist of an address bus and a data bus. Typically aircraft bus systems use serial data transfer because it minimizes the size and weight of aircraft cabling.

In some scenarios, it is desirable to connect a number of line replaceable units (LRUs) to each other. For example, a number of LRUs in the forward section of a vehicle (e.g., an aircraft) may be connected to a number of LRUs in the aft section of the vehicle. Connecting each LRU to every other LRU could result in an unreasonably large number of connections between LRUs. If all of these connections are in the form of copper wires, the resulting space and weight of the connections could be burdensome for the vehicle. Electrical data buses have been used to connect LRUs.

More specifically, it is known to use an electrical controller area network (CAN) to connect electrical devices (also known as "CAN nodes") to each other by way of a multi-master serial bus (also known as a "CAN bus"). The devices that are connected by a CAN bus are typically sensors, actuators, and other control devices. For example, it is known to facilitate communication between a multiplicity of LRUs using an electrical controller area network.

Current electrical CAN bus assemblies on an airplane have many undesirable characteristics, including at least the following: (1) time-consuming assembly of T-couplers involving lifting and reconnecting the double shields on a cable; (2) critical stub lengths from the T-coupler to the LRU prevent reuse of a bus assembly for another CAN bus with the same node quantity; (3) CAN simple electrical signaling is not well protected from electro-magnetic effects (EME) as compared to Arinc 629 doublets; (4) careful treatment of terminator/T-coupler and T-coupler/node interfaces is required to avoid impedance mismatch; and (5) CAN operational issues. such as beyond economic repair, impedance mismatch, and bus reflection become worse for longer airplanes.

A single optical data bus can eliminate some of the weight and size of electrical connections between LRUs. In general, optical communication fibers, such as glass optical fibers and plastic optical fibers, can be lighter and contained in smaller spaces than electrical wiring. In particular, optical networking using plastic optical fibers may provide advantages over networking using copper or other metal wiring. Categories of plastic optical fiber include plastic-clad silicon optical fiber, single-core plastic optical fiber, or multi-core plastic optical fiber. Plastic optical fiber networking may have lower installation and maintenance costs. Moreover, because plastic optical fibers are lighter than the metal wiring that would be needed to carry an equivalent amount of data, using plastic optical fibers may result in appreciable weight savings. The weight savings may be significant for networks onboard vehicles, such as aircraft, where the weight savings may result in reduced fuel consumption and lower emissions.

At present, no industry standard is defined for the fiber optic transmissions of CAN signals. There are industry publication, patents and products for optical CAN bus but they use one or more of the following: separate fibers for transmit and receive to maintain separation of dominant bits and recessive bits; an active optical star with single point failure of the hub; and a single-fiber bidirectional flow of data from point to point (two-node bus) repeater for length extension with a dichroic mirror and two wavelengths.

It would be desirable to provide improvement to enhance the performance of CAN buses comprising a fiber optical network.

SUMMARY

The broad concept disclosed herein for enhancing CAN bus performance converts an electrical CAN bus (e.g., ARINC 825) to a passive optical CAN bus to reduce weight and labor associated with manufacturing and installation of the bus, and to minimize the many bus configurations associated with different data speeds and bus/stub lengths. The optical CAN bus disclosed herein makes use of a single fiber for both transmit and receive, a single wavelength for both transmit and receive, a passive reflective optical star, and high-isolation optical Y-couplers (hereinafter "optical Y-coupler").

More specifically, the subject matter disclosed in detail below is directed to a controller area network (CAN) comprising a plurality of CAN nodes that communicate via a CAN bus that comprises a fiber optical network. The fiber optical network uses a single fiber and a single wavelength for transmit and receive, and comprises a passive reflective optical star, which receives broadcast optical pulses and reflects them back toward all CAN nodes. The reflective optical star comprises an optical mixing rod having a mirror at one end. The other end of the reflective optical star is optically coupled to the transmitters and receivers of a plurality of optical-electrical media converters (including a plurality of transmit optical subassemblies and a plurality of receive optical subassemblies) by way of respective high-isolation optical Y-couplers. Each CAN node produces electrical signals in accordance with the CAN message-based protocol, which electrical signals are converted into optical pulses that are broadcast to the fiber optical network. Those optical pulses are then reflected back to all CAN nodes by the reflective optical star.

The reflective optical star comprises an optical mixer which is connected to the transmitters and receivers respectively of a plurality of optical-electrical media converters by way of a respective plurality of optical Y-couplers. Each optical-electrical media converter comprises a respective receiver optically coupled to one branch of a respective optical Y-coupler by way of a respective output plastic optical fiber and a respective transmitter optically coupled to the other branch of the respective optical Y-coupler by way of a respective input plastic optical fiber. Optionally, glass optical fibers may be used instead of plastic optical fibers.

In accordance with one embodiment, the controller area network comprises a respective signal converter that couples a respective CAN node to a respective transmit optical subassembly and a respective receive optical subassembly, which subassemblies in turn are optically coupled to the reflective star coupler by way of optical fibers and optical Y-couplers. In accordance with the example embodiments disclosed in detail below, the CAN nodes are incorporated in respective line replaceable units (LRUs) onboard an aircraft.

One aspect of the subject matter disclosed in detail below is a data communications system comprising: a plurality of controller area network nodes which operate electrically; a plurality of signal converters electrically coupled to respective controller area network nodes of the plurality of controller area network nodes, each signal converter comprising electrical circuitry that converts differential signals to digital signals and vice versa; a plurality of transmit optical subassemblies electrically coupled to respective signal converters of the plurality of signal converters, each transmit optical subassembly comprising a respective transmitter that converts digital signals from a respective signal converter to optical pulses; a plurality of receive optical subassemblies electrically coupled to respective signal converters of the plurality of signal converters, each receive optical subassembly comprising a respective receiver that converts optical pulses to digital signals which are sent to a respective signal converter; and a fiber optical network optically coupled to the transmitters and receivers for enabling the plurality of controller area network nodes to communicate with each other, wherein the fiber optical network comprises a reflective optical star. In accordance with some embodiments, the fiber optical network further comprises a plurality of optical Y-couplers optically coupled to the reflective optical star, each optical Y-coupler comprising transmit and receive branches which are respectively optically coupled to the transmitter and receiver associated with a respective signal converter. In one proposed implementation, the transmit branch of each optical Y-coupler comprises a first optical fiber having a first side face, the receive branch of each optical Y-coupler comprises a second optical fiber having a second side face that confronts the first side face, and each optical Y-coupler further comprises a layer of reflective material disposed between the first and second side faces of the transmit and receive branches. The first optical fiber has a first end face, the second optical fiber has a second end face, and each optical Y-coupler further comprises a third optical fiber having an end face which is optically coupled to the first and second end faces. The reflective star coupler comprises an optical mixing rod and a mirror disposed at one end of the optical mixing rod.

Another aspect of the subject matter disclosed in detail below is a data communications system comprising: a plurality of electrical devices configured for sending and receiving electrical signals representing data, wherein each of the electrical devices comprises a respective controller area network controller configured to broadcast messages using bitwise arbitration to determine message priority, and a respective controller area network transceiver electrically coupled to the respective controller area network controller; a plurality of signal converters electrically coupled to respective controller area network transceivers of the plurality of controller area network transceivers, each signal converter comprising electrical circuitry that converts differential signals to digital signals and vice versa; a plurality of transmit optical subassemblies electrically coupled to respective signal converters of the plurality of signal converters, each transmit optical subassembly comprising a respective transmitter that converts digital signals from a respective signal converter to optical pulses; a plurality of receive optical subassemblies electrically coupled to respective signal converters of the plurality of signal converters, each receive optical subassembly comprising a respective receiver that converts optical pulses to digital signals which are sent to a respective signal converter; and a fiber optical network optically coupled to the transmitters and receivers for enabling the plurality of controller area network nodes to communicate with each other, wherein the fiber optical network comprises a reflective optical star. In accordance with one embodiment, each of the plurality of electrical devices is a respective line replaceable unit.

A further aspect of the subject matter disclosed in detail below is a data communications system comprising: a plurality of electrical devices configured for sending and receiving electrical signals representing data, wherein each of the electrical devices comprises a respective controller area network controller configured to broadcast messages using bitwise arbitration to determine message priority, and a respective controller area network transceiver electrically coupled to the respective controller area network controller; means for converting differential electrical signals to optical pulses; means for converting optical pulses to differential electrical signals; and a fiber optical network comprising a reflective optical star and a multiplicity of optical wave guides that optically couple the reflective optical star to the means for converting differential electrical signals to optical pulses and to the means for converting optical pulses to differential electrical signals. In accordance with some embodiments, the multiplicity of optical wave guides further comprise a plurality of optical Y-couplers optically coupled to the reflective optical star, each optical Y-coupler comprising transmit and receive branches which are respectively optically coupled to a transmitter associated with a respective means for converting differential electrical signals to optical pulses and a receiver associated with a respective means for converting optical pulses to differential electrical signals.

Yet another aspect is a method for controller area network communication between a plurality of nodes, comprising: broadcasting a message from one of the plurality of nodes, the message comprising transmit differential electrical signals representing a sequence of bits in accordance with a communication protocol that employs bitwise arbitration in response to collision detection; converting the transmit differential electrical signals to optical pulses; guiding the optical pulses toward and into a reflective optical star; reflecting the optical pulses inside the reflective optical star; guiding reflected optical pulses toward the plurality of nodes; converting reflected optical pulses to receive differential electrical signals; and receiving the receive differential electrical signals at each node.

Other aspects of CAN buses comprising a fiber optical network are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

In the drawings, the circle on a symbol representing an electrical device (such as a logic gate or an amplifier) is called a bubble, and is used in logic diagrams to indicate a logic negation between the external logic state and the internal logic state (1 to 0 or vice versa). The positive logic convention (i.e., high voltage level=1) is used.

FIG. 7B is a diagram representing an isometric view of components of a partly assembled fiber bundle and reflective optical star assembly in accordance with the proposed example implementation partly depicted in FIG. 7A.

FIG. 7C is a diagram representing an isometric view of components of a fully assembled fiber bundle and reflective optical star assembly in accordance with the proposed example implementation partly depicted in FIGS. 7A and 7B.

Reference will hereinafter be made to the drawings in which similar elements in different drawings bear the same reference numerals.

DETAILED DESCRIPTION

Illustrative embodiments of CAN buses comprising a fiber optical network are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The technology proposed herein involves the substitution of a fiber optical network having a reflective optical star in place of an electrical data bus in a controller area network. Various embodiments of a fiber optical network for enabling optical communication between LRUs (each LRU incorporating a CAN node) on an aircraft will be described in detail below for the purpose of illustration. However, implementation of a controller area network comprising a fiber optical network is not limited solely to the environment of an aircraft, but rather may be utilized in controller area networks onboard other types of vehicles. Also the embodiments of an optical CAN bus disclosed in detail below have application in networks of electrical devices other than LRUs provided that the electrical devices are configured to incorporate respective CAN nodes.

Technical details concerning the fundamentals and operating principles of controller area networks have been published. However, for the sake of adequate disclosure without incorporation by reference, a brief description of one implementation of a basic CAN bus will be described hereinafter with reference to FIG. 1.

Figure 1:
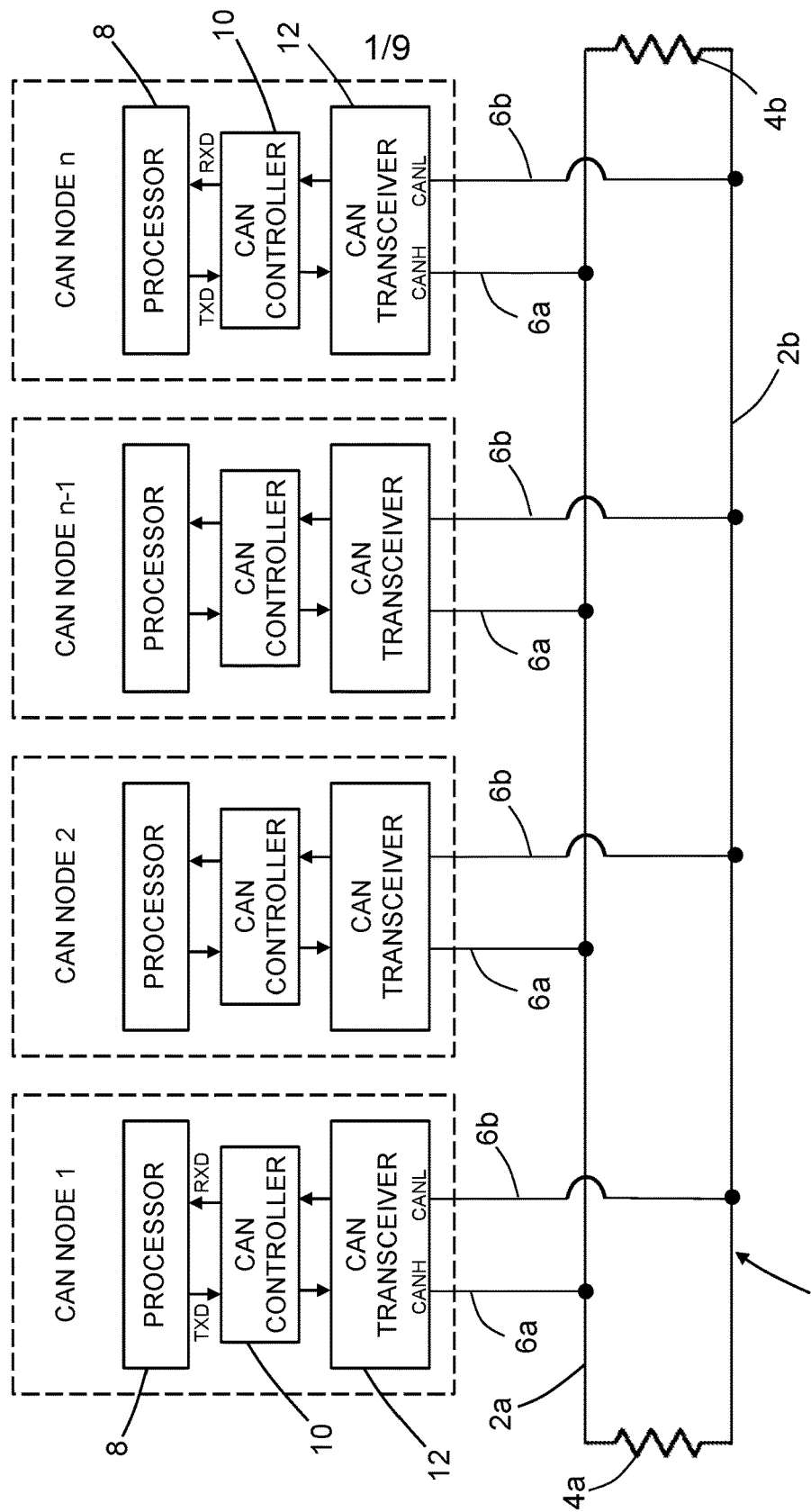
FIG. 1 is a diagram representing (at a high level) one configuration of a basic electrical controller area network.

FIG. 1 is a diagram representing a controller area network comprising a plurality of N CAN nodes connected to bus lines 2a and 2b of a CAN bus 2. The CAN bus is terminated at each end by respective resistors 4a and 4b to prevent signal reflections. Each of the N CAN nodes comprises a respective processor 8, a respective CAN controller 10 and a respective CAN transceiver 12. (In alternative implementations, the CAN controller may be embedded in the processor or embedded in the transceiver. In the latter instance, the resulting component will be referred to herein as a "CAN controller/transceiver".) In accordance with the implementation depicted in FIG. 1, the processor 8 and the CAN transceiver 12 communicate with each other (electrically) by way of the CAN controller 10. Each CAN transceiver 12 is electrically connected to bus lines 2a and 2b of a CAN bus 2 by a pair of stubs 6a and 6b. The bus lines 2a and 2b and the stubs 6a and 6b comprise electrically conductive wires.

In accordance with the CAN communications protocol, each CAN node is able to send and receive messages, but not simultaneously. A message or frame consists primarily of an identifier, which represents the priority of the message, and a number of data bytes. The message is transmitted serially onto the CAN bus 2 by the CAN transceiver 12 and may be received by all CAN nodes. Each CAN node connected to CAN bus 2 waits for a prescribed period of inactivity before attempting to send a message. If there is a collision (i.e., if two nodes try to send messages at the same time), the collision is resolved through a bit-wise arbitration, based on a preprogrammed priority of each message in the identifier field of the message. The message that contains the highest priority identifier always wins bus access.

Still referring to FIG. 1, CAN communication is bi-directional. The processor 8 decides what the received messages mean and what messages it wants to transmit. Sensors, actuators and control devices (not shown in FIG. 1) can be connected to the processor 8. During transmission, the CAN controller 10 sends the transmit message(s) to the CAN transceiver 12, which transmits the bits serially onto the CAN bus 2 when the bus is free. During reception, the CAN transceiver 12 converts the data stream from CAN bus levels to levels that the CAN controller 10 uses. During transmission, the CAN transceiver 12 converts the data stream from the CAN controller 10 to CAN bus levels. More specifically, a driver (not shown in FIG. 1) inside the CAN transceiver 12 converts a digital input on the TXD terminal to a differential output on the CANH and CANL terminals. A receiver (not shown in FIG. 1) inside the CAN transceiver 12 converts the differential signal from the CANH and CANL terminals to a digital output on the RXD terminal. Inside the CAN transceiver 12, the CANH and CANL terminals of the driver are internally tied to the receiver's input, which enables each transmitting node to constantly monitor each bit of its own transmission.

Figure 2:
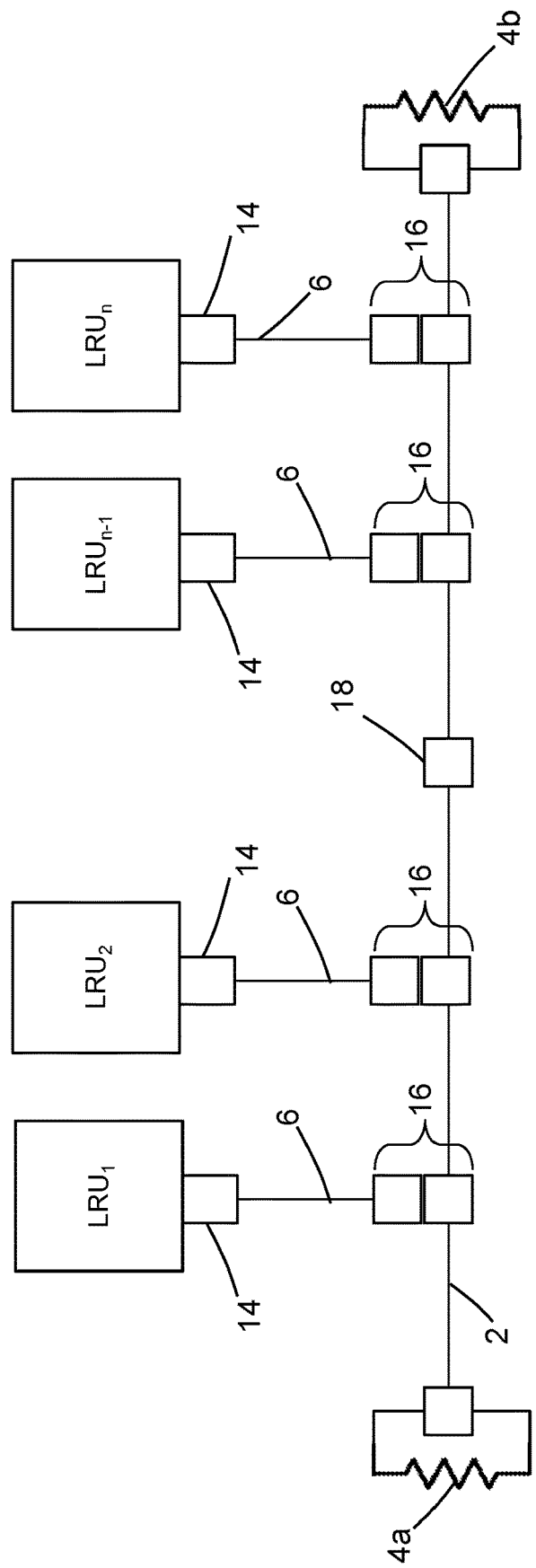
FIG. 2 is a diagram representing a typical topology of an electrical CAN bus that enables a multiplicity of LRUs to communicate with each other.

The above-described CAN node may be incorporated in various types of electrical devices, such a line replaceable unit (LRU). FIG. 2 is a diagram representing a typical topology of an electrical CAN bus that enables a multiplicity of n LRUs (respectively identified as LRU1, LRU2, . . . , LRUn−1, LRUn, to communicate with each other. Each LRU incorporates a CAN node of the type previously described. In addition, each LRU is connected to a CAN bus 2 by way of a respective LRU-stub connector 14, a respective stub cable 6, and a respective stub-bus connector 16. The wires of the left portion of the CAN bus 2 may be electrically connected to wires of the right portion of the CAN bus 2 by a production break connector 18. In accordance with one implementation, each stub-bus connector 16 is a galvanic splice that connects the CAN bus 2 to the stub cable 6, one splice for each node on the bus. The splicing procedure takes up valuable manufacturing time because the shields have to be separated out, the signal wires are spliced and then the shields are connected back in, with heat shrinks and protective sleeves.

Figure 3A:
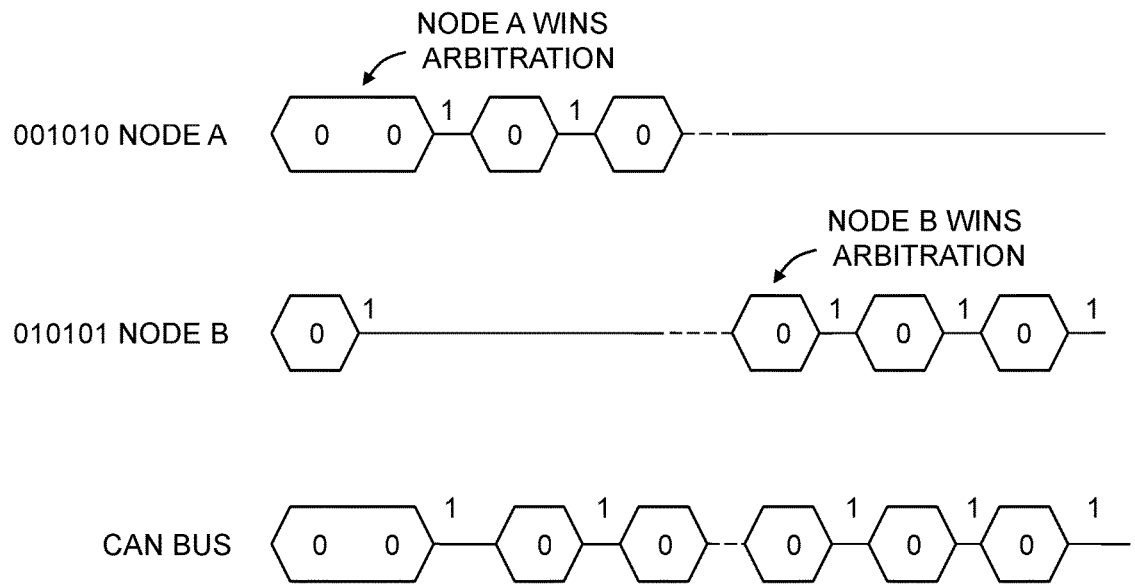
FIG. 3A is a diagram showing an electrical CAN bus bit-wise arbitration between two CAN nodes.
Figure 3B:
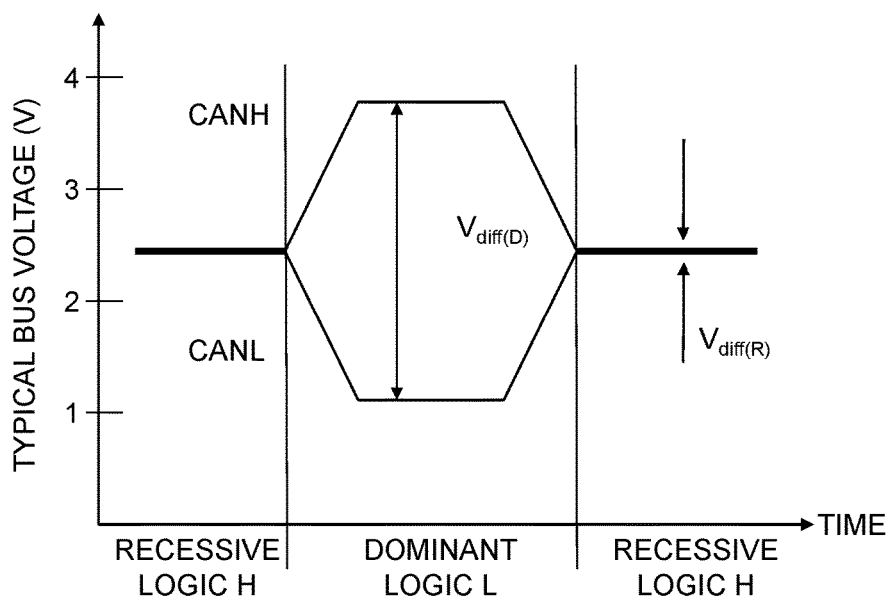
FIG. 3B is a physical bit representation of differential voltage levels (CANH and CANL) corresponding to the two inverted logic states (i.e., dominant and recessive) of a CAN bus.

FIGS. 3A and 3B show the CAN bus protocol for an electrical bus where a dominant bit overdrives a recessive bit on the bus to achieve nondestructive bitwise arbitration. FIG. 3A is a diagram showing an electrical CAN bus bit-wise arbitration between two CAN nodes. FIG. 3B is a physical bit representation of differential voltage levels (CANH and CANL) corresponding to the two inverted logic states (i.e., dominant and recessive) of a CAN bus.

As seen in FIG. 3B, the CAN bus 2 has two states during powered operation of the device: dominant (a logical 0) and recessive (a logical 1). A dominant bus state is when the bus is driven differentially (i.e., the difference in voltage on the CANH and CANL lines is $V_{diff(D)}$), corresponding to a logic low on the TXD and RXD terminals (shown in FIG. 1) of the CAN controller 10 incorporated in each CAN node. A recessive bus state is when the CAN bus 2 is biased via high-resistance internal input resistors of a receiver (not shown) inside the CAN transceiver 12 (i.e., the difference in voltage on the CANH and CANL lines is $V_{diff(R)}$), corresponding to a logic high on the TXD and RXD terminals.

Only one CAN node can transmit data messages at any given time. If two CAN nodes try to access the CAN bus 2 simultaneously, the contention is resolved using lossless bit-wise arbitration. Lossless means that the CAN node that wins the arbitration continues to transmit its message without the message being destroyed or corrupted by another CAN node. The CAN arbitration process is handled automatically by the CAN controller 10. Priority is allocated to a particular CAN node based on an 11-bit identifier which is transmitted by all CAN nodes at the start of each CAN frame. The CAN node with the lowest identifier transmits more zeros at the start of the frame, and that node wins the arbitration or is given the highest priority. A dominant bit always overwrites a recessive bit on a CAN bus.

One example of the CAN bit-wise arbitration is shown in FIG. 3A. The upper portion represents a sequence of bits being generated by node A during a time interval; the middle portion represents a sequence of bits being generated by node B during the same time interval; and the lower portion represents the sequence of bits transmitted on the CAN bus 2 as a result of the bit-wise arbitration process. Because each node continuously monitors its own transmissions, as node B's recessive bit is overwritten by node A's higher-priority dominant bit, node B detects that the bus state does not match the bit that it transmitted. Therefore, node B halts transmission while node A continues on with its message. Another attempt to transmit the message is made by node B once the bus is released by node A. This attempt is successful, as seen in FIG. 3A.

Figure 4A:
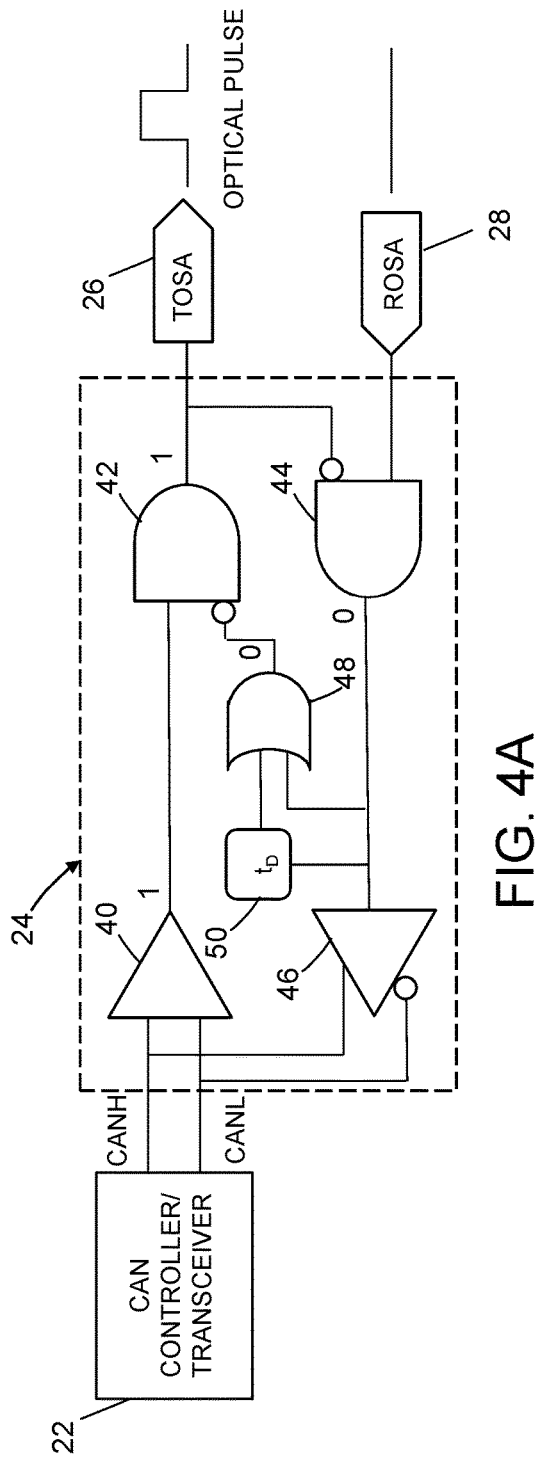
FIGS. 4A and 4B are hybrid diagrams (combining elements of a block diagram and elements of a logical circuit diagram) representing some components of an optical controller area network in a transmit mode (FIG. 4A) and in a receive mode (FIG. 4B) in accordance with one embodiment.
Figure 4B:
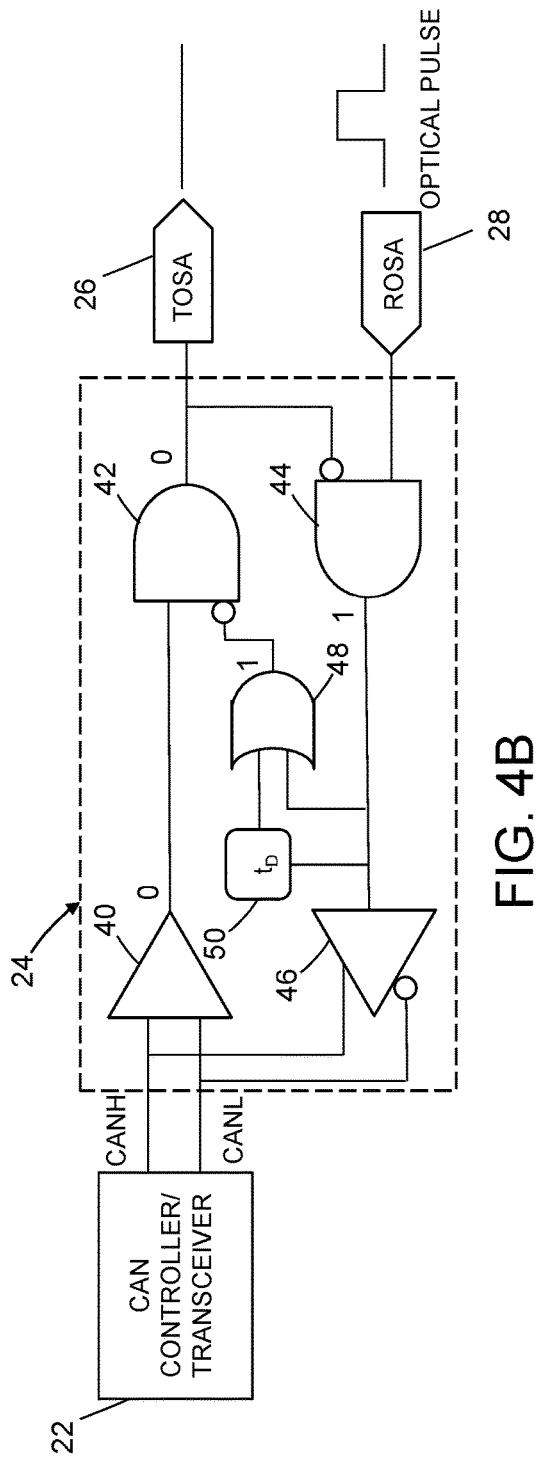

The electrical CAN bus 2 shown in FIG. 2 can be replaced by a passive optical CAN bus to reduce weight and labor associated with manufacturing and installation of the bus, and to minimize the many bus configurations associated with different data speeds and bus/stub lengths. FIGS. 4A and 4B identify some components of an optical controller area network in a transmit mode (FIG. 4A) and in a receive mode (FIG. 4B) in accordance with one embodiment. The optical controller area network comprises a plurality of electrical CAN nodes operatively coupled to a passive reflective optical coupler (not shown in FIGS. 4A and 4B). Each electrical CAN node comprises a respective CAN controller/transceiver 22 which is operatively coupled to a respective transmit optical subassembly 26 (TOSA) and a respective receive optical subassembly 28 (ROSA) by way of a respective signal converter 24. More specifically, the signal converter 24 converts CANH and CANL voltage signals received from the CAN controller/transceiver 22 to electrical logic bits which are sent to the transmit optical subassembly 26 and converts electrical logic bits received from the receive optical subassembly 28 to CANH and CANL voltage signals which are sent to the CAN controller/ transceiver 22.

The signal converter 24 depicted in FIGS. 4A and 4B comprises the following electrical components: (a) a first amplifier 40 having differential input terminals respectively connected to the CANH and CANL terminals of the CAN controller/transceiver 22 and an output terminal; (b) an OR gate 48 having first and second input terminals and an output terminal; (c) a first AND gate 42 having a first input terminal connected to the output terminal of the first amplifier 40, a second input terminal configured and connected to receive an inverted bit from the output terminal of the OR gate 48, and an output terminal connected to the transmit optical subassembly 26; (d) a second AND gate 44 having a first input terminal connected to receive an inverted bit from the output terminal of the first AND gate 42, a second input terminal connected to the receive optical subassembly 28, and an output terminal connected to the first input terminal of the OR gate 48; (e) a second amplifier 46 having an input terminal connected to the output terminal of the second AND gate 44, a first output terminal connected to the CANH terminal of the CAN controller/transceiver 22, and a second output terminal configured and connected output an inverted voltage signal to the CANL terminal of the CAN controller/ transceiver 22; and (f) a shift register 50 having an input terminal connected to the output terminal of the second AND gate 44 and an output terminal connected to the second input terminal of the OR gate 48. The shift register 50 provides a propagation time delay for the signal in the internal loop from the output terminal of the second AND gate 44 to the second input terminal of the first AND gate 42.

FIGS. 4A and 4B show how the dominant/recessive bit behavior in an electrical CAN bus is achieved in the optical domain in accordance with one embodiment. A recessive state output from a node means no optical pulse is transmitted. A dominant state output from a node means an optical pulse is transmitted. The bit output by the AND gate 42 is inverted and fed back to the AND gate 44. The bit output by the AND gate 44 is then looped back to the AND gate 42 via the OR gate 48 to lock out other CAN controller/ transceivers (see FIG. 5) that are connected and configured to communicate with CAN controller/transceiver 22 via the transmit and receive optical subassemblies 26, 28. Collision from optical transmitters with different numbers of dominant state bits (i.e., optical pulses) is similar to how a dominant CAN signal is supposed to behave, i.e., the transmitter that transmits more successive optical pulses at the start of a CAN frame wins the arbitration and continues to transmit its message.

Figure 5:
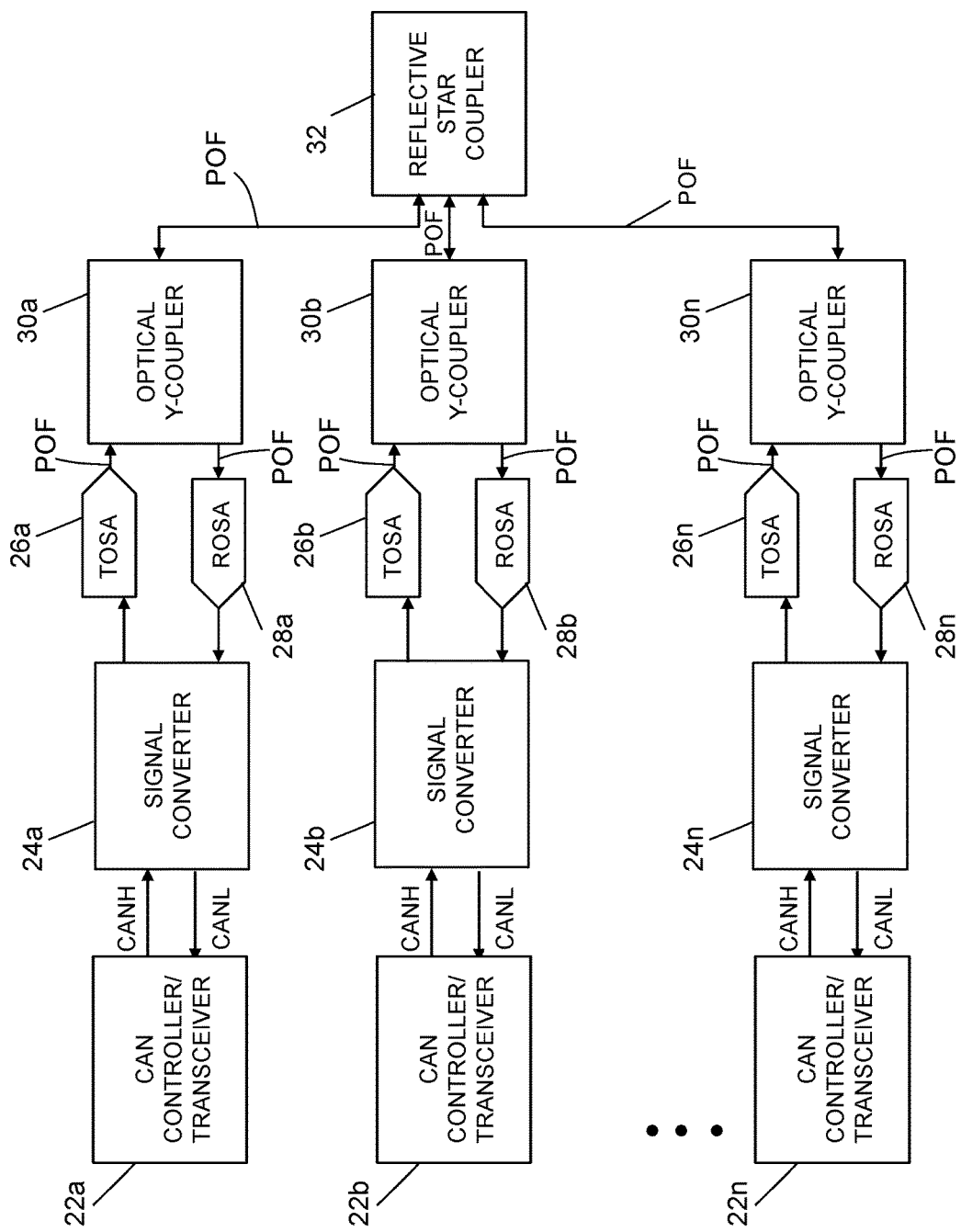
FIG. 5 is a hybrid diagram representing an optical controller area network comprising a reflective optical star in accordance with one embodiment.

The configuration of components depicted in FIG. 4A can be used to connect multiple CAN controller/transceivers to a single reflective optical star. FIG. 5 depicts a multiplicity of CAN controller/transceivers 22a through 22n (where n is an integer equal to three or more) operatively coupled to a reflective optical star 32. CAN controller/transceiver 22a is operatively coupled to reflective optical star 32 by way of a signal converter 24a, a transmit optical subassembly 26a, a receive optical subassembly 28a, and an optical Y-coupler 30a having two branches which are respectively optically coupled to the transmit and receive optical subassemblies 26a, 28a. CAN controller/transceiver 22b is operatively coupled to reflective optical star 32 by way of a signal converter 24b, a transmit optical subassembly 26b, a receive optical subassembly 28b, and an optical Y-coupler 30b having two branches which are respectively optically coupled to the transmit and receive optical subassemblies 26b, 28b. CAN controller/transceiver 22n is operatively coupled to reflective optical star 32 by way of a signal converter 24n, a transmit optical subassembly 26n, a receive optical subassembly 28n, and an optical Y-coupler 30n having two branches which are respectively optically coupled to the transmit and receive optical subassemblies 26n, 28n. In accordance with the embodiment depicted in FIG. 5, each of the signal converters 24a through 24n comprises the components depicted inside the dashed rectangle in FIG. 4. In addition, the optical Y-couplers are optically coupled to the transmit and receive optical subassemblies and the reflective optical star by way of plastic optical fibers (POF in FIG. 5).

An optical fiber is a cylindrical dielectric waveguide that transmits light along its axis. The fiber consists of a transparent core surrounded by a transparent cladding layer (hereinafter "cladding"), both of which are made of dielectric materials. Light is kept in the core by the phenomenon of total internal reflection. To confine the optical signal in the core, the refractive index of the core is greater than that of the cladding. The boundary between the core and cladding may either be abrupt, as in step-index fiber, or gradual, as in graded-index fiber. The embodiments disclosed herein employ plastic optical fibers. Plastic optical fibers have high transmission capacity, excellent immunity to electromagnetic interference-induced noise, light weight, high mechanical strength, and outstanding flexibility. Plastic optical fibers are also larger in diameter as compared to glass optical fibers. Due to their larger diameters, plastic optical fibers have greater tolerance for fiber misalignment than glass optical fibers have. Because of this large misalignment tolerance, plastic optical fiber-based networks have lower maintenance and installation costs. In aerospace platforms, plastic optical fibers also greatly reduce the cost of connectors and transceiver components used in an avionics network. In alternative embodiments, glass optical fibers can be used in place of plastic optical fibers.

In accordance with the embodiments disclosed herein, the reflective optical star 32 is operatively coupled to the CAN controller/transceivers 22a through 22n with only one plastic optical fiber (POF) per CAN controller/transceiver using optical Y-couplers 30a through 30n. Thus, by using reflective optical star 32, any dominant signal (an optical pulse) on the CAN bus can be seen by the sender's own receiver and also by all other receivers on the CAN bus, which overrides all recessive signal senders.

Figure 6:
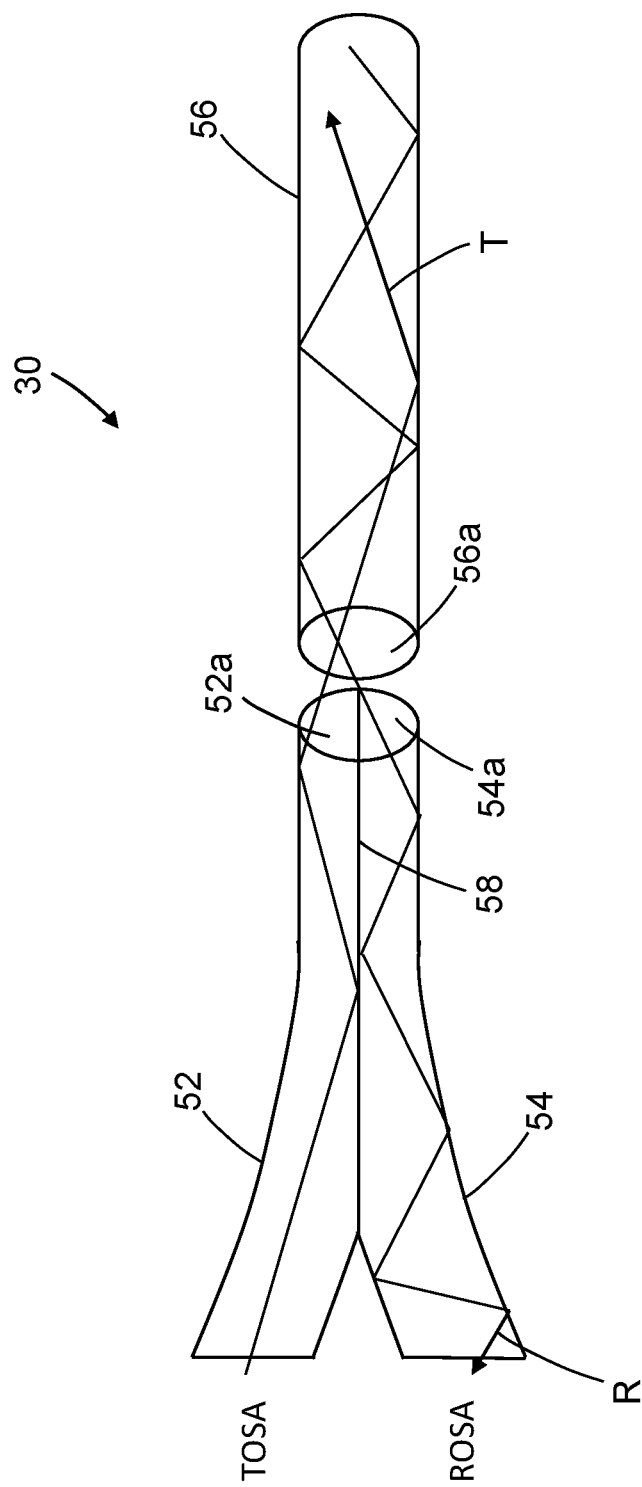
FIG. 6 is a diagram representing an optical Y-coupler that facilitates the propagation of incoming light by internal reflection. The arrow pointing to the right represents optical pulses propagating from a transmit optical subassembly toward a reflective optical coupler; the arrow pointing to the left represents optical pulses propagating from the reflective optical coupler toward a receive optical subassembly associated with the transmit optical subassembly.

FIG. 6 is a diagram representing an optical Y-coupler 30 in accordance one embodiment. The optical Y-coupler 30 comprises three plastic optical fibers 52, 54 and 56. Although not depicted in FIG. 6, the end faces 52a and 54a of plastic optical fibers 52 and 54 will be bonded and optically coupled to the end face 56a of plastic optical fiber 56. The optical Y-coupler 30 is designed to facilitate the propagation of incoming light by internal reflection. The arrow T pointing to the right in FIG. 6 represents light propagating from left to right through optical Y-coupler 30 (e.g., from a transmit optical subassembly 26 to a reflective optical star 32), whereas the arrow R pointing to the left represents light propagating from right to left (e.g., from the reflective optical star 32 to a receive optical subassembly 28 associated with the transmit optical subassembly 26). The optical Y-coupler 30 enables single-fiber connection of a CAN node to the reflective optical star 32. In accordance with one example of a proposed implementation, a single 1-mm-diameter plastic optical fiber (not shown in FIG. 6) is used for bidirectional data transmission from plastic optical fiber 56 of each optical Y-coupler 30 to the reflective optical star 32, as seen in FIG. 5. Similarly the transmit and receive branches formed by plastic optical fibers 52 and 54 are optically coupled to respective 1-mm-diameter plastic optical fiber stubs which connect to the transmit and receive optical subassemblies 26 and 28 respectively, as seen in FIG. 5.

In accordance with the above-described proposed implementation, the plastic optical fibers 52, 54 and 56 each have a diameter of 1 mm except along respective end sections of plastic optical fibers 52, 54. Each of the plastic optical fibers 52 and 54 comprise respective end sections where fiber material has been removed to form respective planar faces and respective semicircular end faces 52a and 54a. The end sections begin where the circular cross sections of plastic optical fibers 52 and 54 transition to non-circular and terminate at the semicircular end faces 52a and 54a respectively. More specifically, the end section of plastic optical fiber 52 is shaped to form a first side face that intersects and is perpendicular to end face 52a, while the end section of plastic optical fiber 54 is shaped to form a second side face that intersects and is perpendicular to end face 54a. These side faces are bonded to opposite surfaces of a thin layer of reflective material 58, such as silver. The thin layer of reflective material 58 prevents cross-talk between the respective end sections of the plastic optical fibers 52 and 54. The semicircular end faces 52a and 54a of the plastic optical fibers 52 and 54 combine to form a circular end face that is bonded and optically coupled to a circular end face 56a of the plastic optical fiber 56 by a layer of index matching epoxy (not shown in FIG. 6). This index matching epoxy eliminates the back reflection at the semicircular end face 54a that may cause cross-talk from the transmit optical subassembly 26 to the associated receive optical subassembly 28 of the same CAN node.

The construction of a POF bundle and reflective optical star assembly in accordance with one proposed example implementation will now be described with reference to FIGS. 7A through 7C.

Figure 7A:
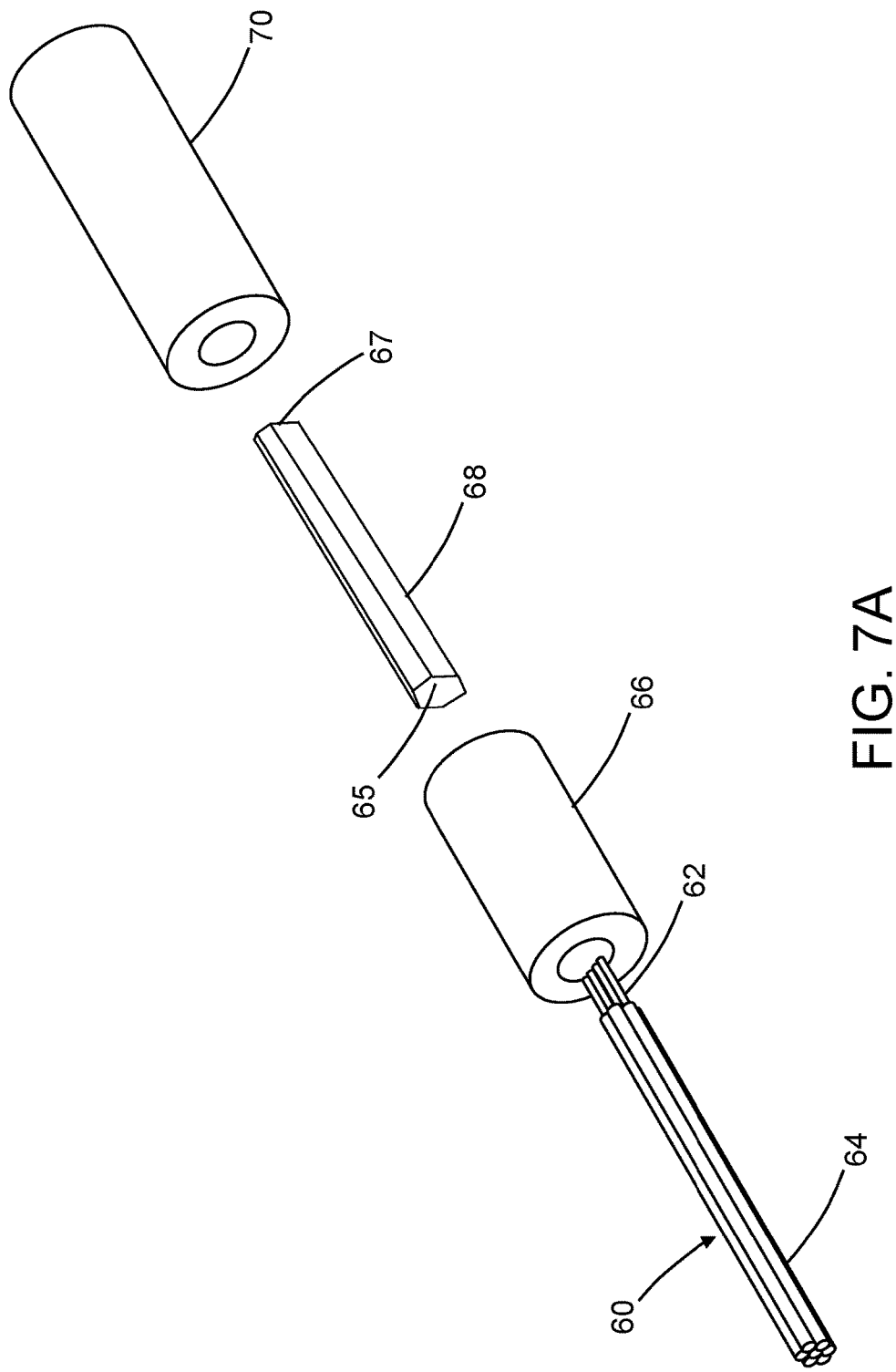
FIG. 7A is a diagram representing an exploded view of some components of a fiber bundle and reflective optical star assembly in accordance with one proposed example implementation.

FIG. 7A is an exploded view showing the following components: a fiber bundle 60 comprising a multiplicity of (in this example, seven) plastic optical fibers 62 surrounded by protective jackets 64 (except for the raw ends visible in FIG. 7A); a fiber bundle sleeve 66 in which an end portion of the fiber bundle 60 will be inserted during assembly; an optical mixing rod 68 having a hexagonal cross-sectional profile; and a mixing rod sleeve 70 in which the optical mixing rod 68 will be inserted during assembly. A first end face 65 of the optical mixing rod 66 is polished and will be optically coupled to the end faces of the seven plastic optical fibers 64; a second end face of the optical mixing rod 66 is coated with a thin film of reflective material that forms a mirror 67.

FIG. 7B is an isometric view of a partly assembled fiber bundle and reflective optical star assembly having the components depicted in FIG. 7A. The end portion of the fiber bundle 60 (which end portion includes the raw ends of the plastic optical fibers 64) is surrounded by the fiber bundle sleeve 66. The axial portion of the fiber bundle sleeve 66 that receives the raw ends of the plastic optical fibers 64 has a tapered internal surface in the axial portion of the fiber bundle sleeve 66 which constrains the raw ends of the plastic optical fibers 64. The optical mixing rod 68 is surrounded by the mixing rod sleeve 70. FIG. 7B shows that the fiber bundle sleeve 66 and the mixing rod sleeve 70 separated by a gap. In the final assembly, the end faces of the fiber bundle sleeve 66 and mixing rod sleeve 70 will abut each other and the end faces of the plastic optical fibers 64 will be bonded and optically coupled to end face 65 of the optical mixing rod 66.

FIG. 7C shows an isometric view of components of a fully assembled fiber bundle and reflective optical star assembly in accordance with the proposed example implementation partly depicted in FIGS. 7A and 7B. In the final assembly, the end faces of fiber bundle sleeve 66 and mixing rod sleeve 70 abut each other. In addition, the end faces of plastic optical fibers 64 are bonded and optically coupled to end face 65 of the optical mixing rod 66 by a layer of index matching epoxy (not visible in FIG. 7C). The function of the optical mixing rod 66 is to mix all the electro-magnetic modes that propagate from any one of the seven plastic optical fibers 64 so that, following reflection by the mirror 67, the reflected electromagnetic radiation will be uniformly distributed to all seven plastic optical fibers 64. The fiber bundle sleeve 66 and mixing rod sleeve 70 are in turn surrounded by a star outer housing 72.

Figure 8:
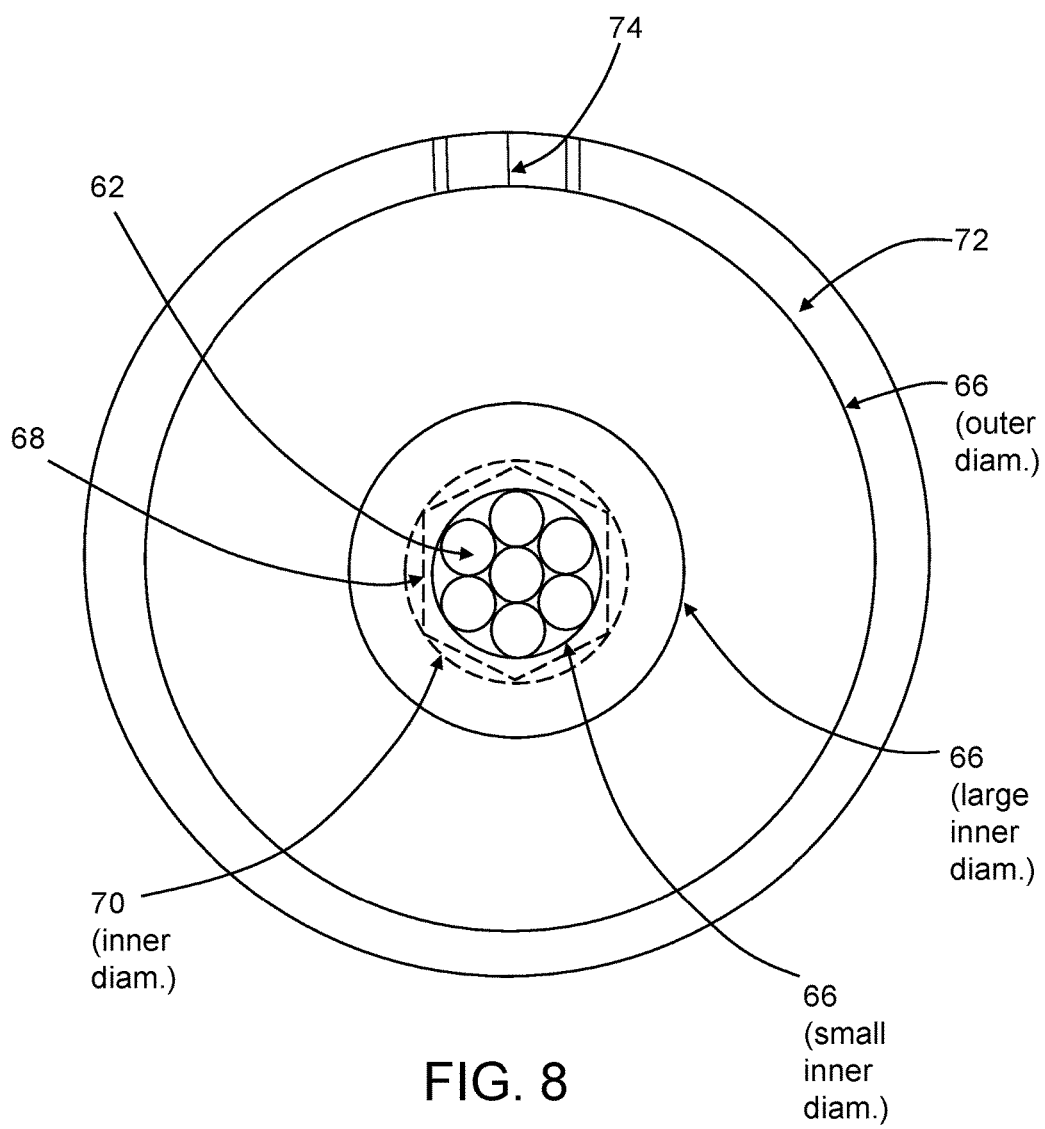
FIG. 8 is a diagram representing the geometry of various components of the fully assembled fiber bundle and reflective optical star assembly depicted in FIG. 7C.

FIG. 8 is a diagram representing the geometry of various components of the fully assembled fiber bundle and reflective optical star assembly depicted in FIG. 7C. The outer diameters of the fiber bundle sleeve 66 and mixing rod sleeve 70 are equal. The star outer housing 72 is a circular cylinder having an inner diameter greater than the outer diameter of the sleeves. The star outer housing 72 is provided with an access hole 74 for the injection of adhesive between the star outer housing 72 and the sleeves. The fiber bundle sleeve 66 comprises two circular cylindrical sections having relatively smaller and relatively larger inner diameters respectively. The circular cylindrical section having the relatively larger inner diameter surrounds a jacketed portion of the fiber bundle 60, whereas the circular cylindrical section having the relatively smaller inner diameter surrounds the raw ends of the plastic optical fibers 64. In one proposed implementation, the plastic optical fibers 64 have an outer diameter of 1 mm. The inner diameter of the mixing rod sleeve 70 is indicated by the dashed circle in FIG. 8. The cross-sectional profile of the optical mixing rod 66 is indicated by the dashed hexagon inside the dashed circle in FIG. 8. The location of the end faces of the seven plastic optical fibers 64 inside the dashed hexagon represents the fact that all of the fibers are optically coupled to the first end face 65 of the optical mixing rod 66.

In accordance with one example proposed implementation, each signal converter 24 (see FIG. 4A) is electrically coupled to a respective optical-electrical media converter. Each optical-electrical media converter comprises: a respective transmitter that has a laser for converting electrical signals received from a respective signal converter 24 into optical signals to be sent to the optical mixing rod 66 of the reflective optical star 32; and a respective receiver that has a photodetector that converts optical signals received from the optical mixing rod 66 into electrical signals to be sent to the respective signal converter 24.

CAN node components that are suitable for use in the applications disclosed above are commercially available from Texas Instruments Inc., (such as the SN65HVD26x CAN transceiver).

The optical CAN bus disclosed herein uses a single fiber for transmit and receive, a single wavelength for transmit and receive, and a passive reflective optical star to avoid single-point electronic failure as in an active star. In accordance with one proposed implementation, a single 1-mm-diameter POF is used for bidirectional data transmission from one LRU to the reflective optical star by way of an optical Y-coupler with high isolation between transmit and receive branches which are also optically coupled to a pair of 1-mm-diameter POF stubs. The assembly provides a simple optical fiber bus with no connectors between the passive reflective optical star and POF stubs, no splices and no terminators. The resulting optical CAN bus functions independent of selected bus speed and independent of the distance from the reflective optical star to the CAN nodes inside the LRUs.

The optical CAN bus disclosed herein can be employed on any mobile platform (car, tank, airplane, helicopter, spaceship, etc.) or fixed platform (industrial machinery, etc.) to eliminate EME and reduce weight, size and manufacturing time associated with the limitations of electrical CAN buses.

While optical networking systems have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used in the claims, the term "optical waveguide" includes at least one of the following types of elements configured to guide electromagnetic radiation propagating through the waveguide: optical fibers, optical connectors, optical Y-couplers and optical mixing rods.

In addition, the corresponding structure (disclosed hereinabove) that performs the function of "converting differential electrical signals to optical pulses" (as recited in the claims) comprises the signal converter 24 and the transmit optical subassembly 26 and equivalents thereof; and the corresponding structure (disclosed hereinabove) that performs the function of "converting optical pulses to differential electrical signals" (as recited in the claims) comprises the signal converter 24 and the receive optical subassembly 28 and equivalents thereof.

The invention claimed is:

1. A data communications system comprising:
a plurality of controller area network nodes which operate electrically;

a plurality of signal converters electrically coupled to respective controller area network nodes of the plurality of controller area network nodes, each signal converter comprising electrical circuitry that converts differential signals to digital signals and vice versa;

a plurality of transmit optical subassemblies electrically coupled to respective signal converters of the plurality of signal converters, each transmit optical subassembly comprising a respective transmitter that converts digital signals from a respective signal converter to optical pulses;

a plurality of receive optical subassemblies electrically coupled to respective signal converters of the plurality of signal converters, each receive optical subassembly comprising a respective receiver that converts optical pulses to digital signals which are sent to a respective signal converter; and a fiber optical network optically coupled to the transmitters and receivers for enabling the plurality of controller area network nodes to communicate with each other, wherein the fiber optical network comprises a reflective optical star, wherein the fiber optical network further comprises a plurality of optical Y-couplers optically coupled to the reflective optical star, each optical Y-coupler comprising transmit and receive branches which are respectively optically coupled to the transmitter and receiver associated with a respective signal converter, and wherein the transmit branch of each optical Y-coupler comprises a first optical fiber having a first side face, the receive branch of each optical Y-coupler comprises a second optical fiber having a second side face that confronts the first side face, and each optical Y-coupler further comprises a layer of reflective material disposed between the first and second side faces of the transmit and receive branches.

2. The system as recited in claim 1, wherein the first optical fiber has a first end face, the second optical fiber has a second end face, and each optical Y-coupler further comprises a third optical fiber having an end face which is optically coupled to the first and second end faces.

3. The system as recited in claim 1, wherein each optical Y-coupler further comprises a first layer of index matching epoxy disposed between the first and third end faces and a second layer of index matching epoxy disposed between the second and third end faces.

4. The system as recited in claim 3, wherein the reflective star coupler comprises an optical mixing rod and a mirror disposed at one end of the optical mixing rod.

5. The system as recited in claim 1, wherein each of the plurality of controller area network nodes comprises a respective controller area network controller and a respective controller area network transceiver electrically coupled to the respective controller area network controller, the controller area network controllers being configured to communicate using bitwise arbitration.

6. The system as recited in claim 5, wherein each signal converter comprises:
a first amplifier having differential input terminals respectively connected to CANH and CANL terminals of a respective controller area network transceiver and an output terminal;
an OR gate having first and second input terminals and an output terminal;
a first AND gate having a first input terminal connected to the output terminal of the first amplifier, a second input terminal configured and connected to receive an inverted bit from the output terminal of the OR gate, and an output terminal connected to a respective transmit optical subassembly;
a second AND gate having a first input terminal connected to receive an inverted bit from the output terminal of the first AND gate, a second input terminal connected to a respective receive optical subassembly, and an output terminal connected to the first input terminal of the OR gate; and
a second amplifier having an input terminal connected to the output terminal of the second AND gate, a first output terminal connected to the CANH terminal of the respective controller area network transceiver, and a second output terminal configured and connected output an inverted voltage signal to the CANL terminal of the respective controller area network transceiver.

7. The system as recited in claim 6, further comprising a shift register having an input terminal connected to the output terminal of the second AND gate and an output terminal connected to the second input terminal of the OR gate.

8. A data communications system comprising:
a plurality of electrical devices configured for sending and receiving electrical signals representing data, wherein each of the electrical devices comprises a respective controller area network controller configured to broadcast messages using bitwise arbitration to determine message priority, and a respective controller area network transceiver electrically coupled to the respective controller area network controller;

a plurality of signal converters electrically coupled to respective controller area network transceivers of the plurality of controller area network transceivers, each signal converter comprising electrical circuitry that converts differential signals to digital signals and vice versa;

a plurality of transmit optical subassemblies electrically coupled to respective signal converters of the plurality of signal converters, each transmit optical subassembly comprising a respective transmitter that converts digital signals from a respective signal converter to optical pulses;

a plurality of receive optical subassemblies electrically coupled to respective signal converters of the plurality of signal converters, each receive optical subassembly comprising a respective receiver that converts optical pulses to digital signals which are sent to a respective signal converter; and a fiber optical network optically coupled to the transmitters and receivers for enabling the plurality of controller area network nodes to communicate with each other, wherein the fiber optical network comprises a reflective optical star, wherein the fiber optical network further comprises a plurality of optical Y-couplers optically coupled to the reflective optical star, each optical Y-coupler comprising transmit and receive branches which are respectively optically coupled to the transmitter and receiver associated with a respective signal converter, and wherein the transmit branch of each optical Y-coupler comprises a first optical fiber having a first side face, the receive branch of each optical Y-coupler comprises a second optical fiber having a second side face that confronts the first side face, and each optical Y-coupler further comprises a layer of reflective material disposed between the first and second side faces of the transmit and receive branches.

9. The system as recited in claim 8, wherein the reflective star coupler comprises an optical mixing rod and a mirror disposed at one end of the optical mixing rod.

10. The system as recited in claim 8, wherein each of the plurality of electrical devices is a respective line replaceable unit.

11. A data communications system comprising:
a plurality of electrical devices configured for sending and receiving electrical signals representing data, wherein each of the electrical devices comprises a respective controller area network controller configured to broadcast messages using bitwise arbitration to determine message priority, and a respective controller area network transceiver electrically coupled to the respective controller area network controller;
means for converting differential electrical signals to optical pulses;
means for converting optical pulses to differential electrical signals; and
a fiber optical network comprising a reflective optical star and a multiplicity of optical wave guides that optically couple the reflective optical star to the means for converting differential electrical signals to optical pulses and to the means for converting optical pulses to differential electrical signals,
wherein the multiplicity of optical wave guides further comprise a plurality of optical Y-couplers optically coupled to the reflective optical star, each optical Y-coupler comprising transmit and receive branches which are respectively optically coupled to a transmitter associated with a respective means for converting differential electrical signals to optical pulses and a receiver associated with a respective means for converting optical pulses to differential electrical signals, and
wherein the transmit branch of each optical Y-coupler comprises a first optical fiber having a first side face, the receive branch of each optical Y-coupler comprises a second optical fiber having a second side face that confronts the first side face, and each optical Y-coupler further comprises a layer of reflective material disposed between the first and second side faces of the transmit and receive branches.

12. The system as recited in claim 11, wherein the reflective star coupler comprises an optical mixing rod and a mirror disposed at one end of the optical mixing rod.

13. The system as recited in claim 11, wherein each of the plurality of electrical devices is a respective line replaceable unit.

* * * * *